Sept. 26, 1939. A. W. SIZER 2,174,141
EXTRUSION MACHINE FOR MOLDING PELLETS FROM PLASTIC SUBSTANCES
Filed June 20, 1938 3 Sheets-Sheet 1
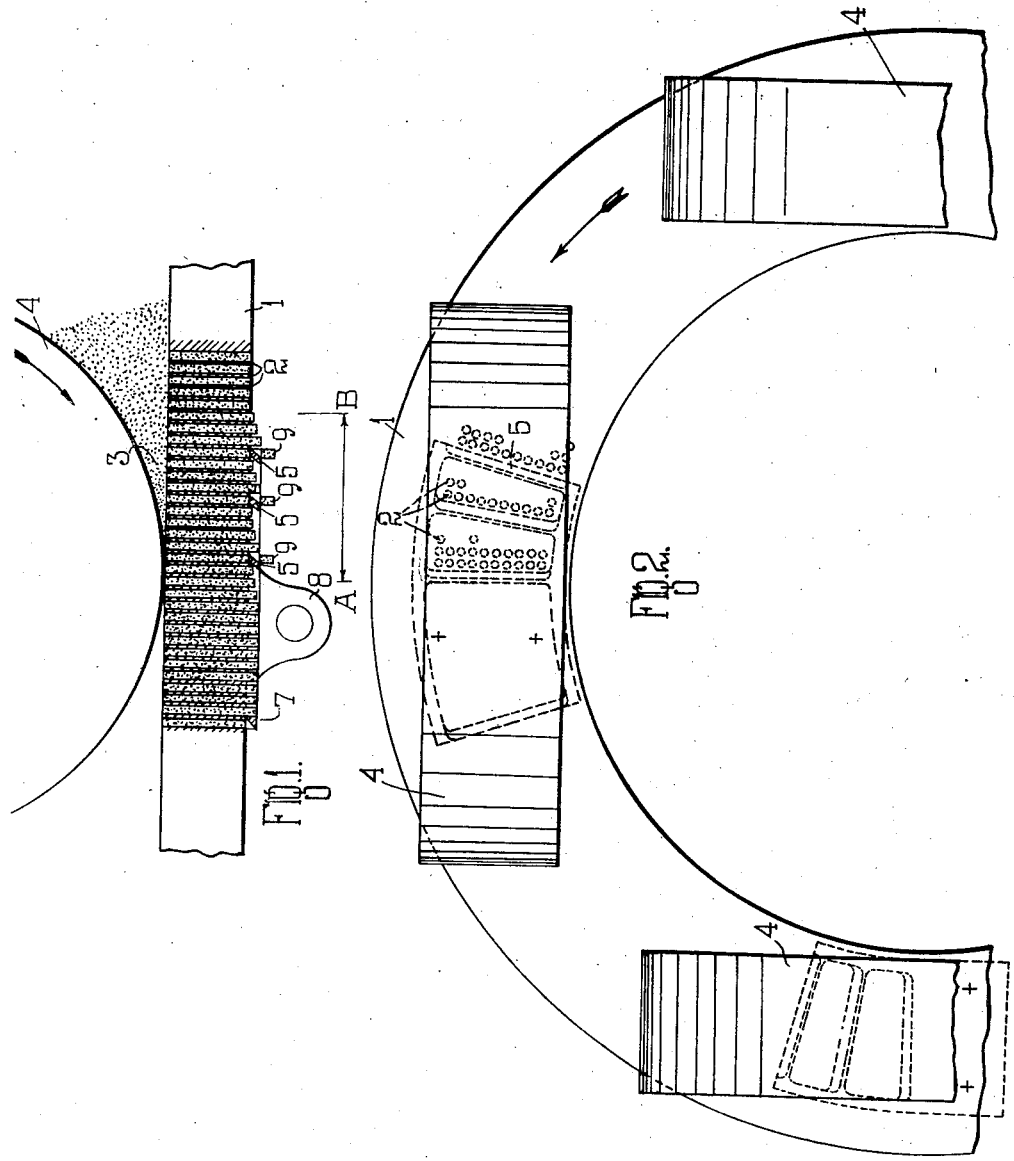
Inventor:
Albert W. Sizer
By: Mason & Porter
Attorneys

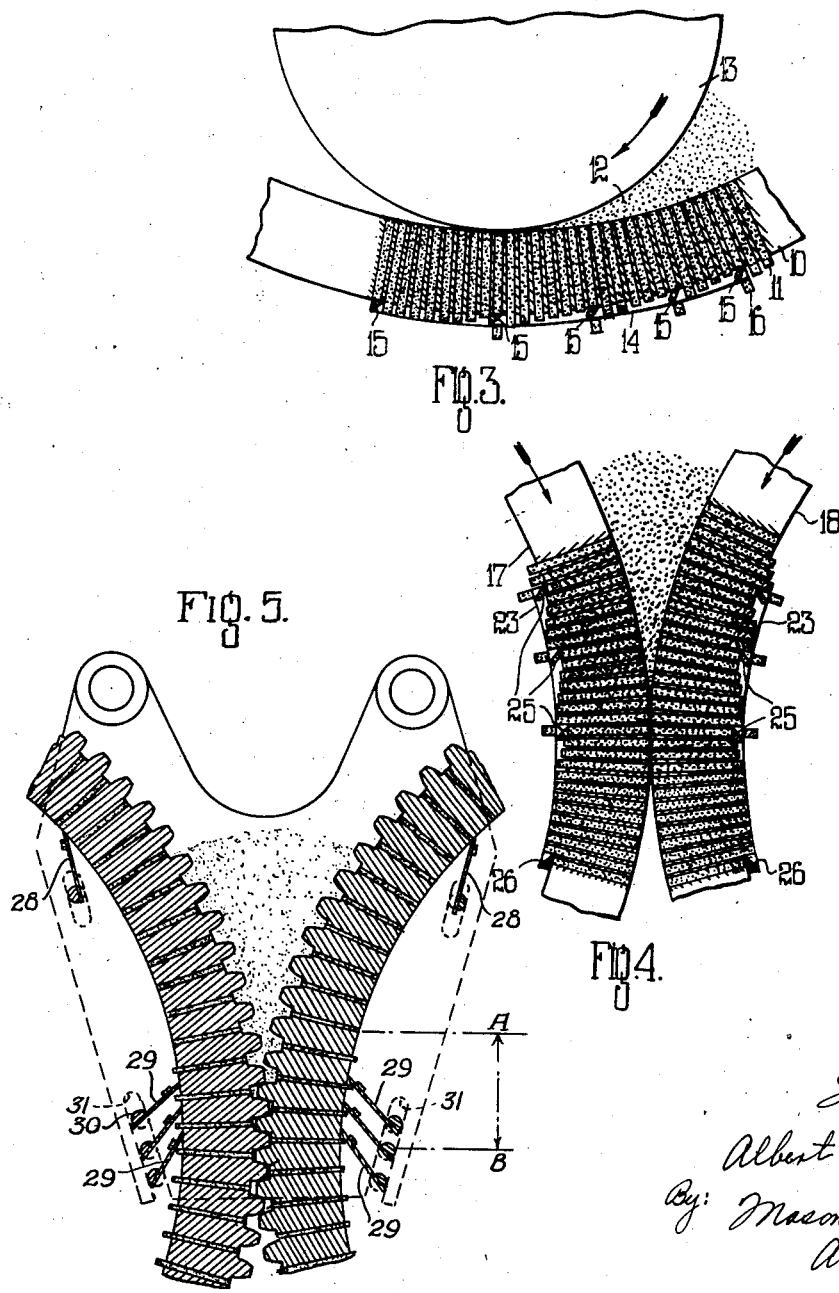

Sept. 26, 1939. A. W. SIZER 2,174,141
EXTRUSION MACHINE FOR MOLDING PELLETS FROM PLASTIC SUBSTANCES
Filed June 20, 1938 3 Sheets-Sheet 3
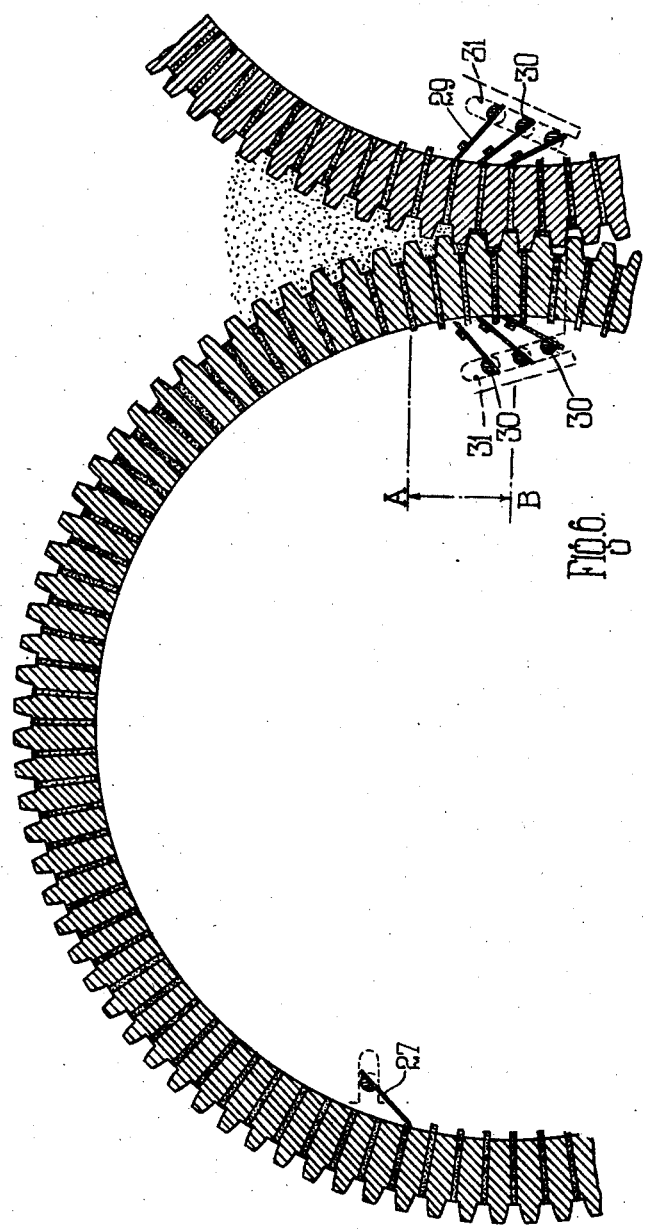

Patented Sept. 26, 1939

2,174,141

UNITED STATES PATENT OFFICE 2,174,141

EXTRUSION MACHINE FOR MOLDING PELLETS FROM PLASTIC SUBSTANCES

Albert William Sizer, Hessle, England

Application June 20, 1938, Serial No. 214,826
In Great Britain August 4, 1937

1 Claim. (Cl. 107—8)

The present invention relates to an extrusion molding machine of the type in which material, such as meal is forced through a perforation or a group of perforations in a die plate or ring in sequence and severed on the opposite side by blades displaced relatively to the die plate or ring.

An object of the present invention is to provide pellets or cubes of short length.

According to the present invention the material is forced through perforations in a plate or cylindrical die by means of one or more rollers and is severed as it is extruded on the opposite side of the perforated die plate or cylinder by means of a plurality of knife blades, at least one being disposed within the area of perforations through which meal exudes due to the compressive force of any individual roller, and one disposed outside this area. By this means the output of short pellets from the machine is very materially increased while maintaining such pellets of uniform length.

The invention is more particularly described with reference to the accompanying drawings, in which—

Figure 1 is a diagrammatic elevation of one form of construction.

Figure 2 is a corresponding plan view.

Figure 3 is an elevation of an alternative form of construction.

Figure 4 is a sectional elevation of a further form of construction.

Figures 5 and 6 are sectional elevations of further forms of construction.

In the arrangement of Figures 1 and 2, an annular die plate 1 having a plurality of perforations 2 is rotated about a vertical axis and meal is fed to the space 3 between said die plate and a roller 4. The roller 4 may be either positively driven or rotated by friction with the top surface of the die plate to force meal through the perforations 2 in sequence. A number of cutters 5, preferably mounted on a common plate 8 are disposed within the area of the die 1 through which at any one time meal is extruded by the roller 4 to cut off short pellets or cubes 9 as these are extruded. In the instance shown and described, the pellets or cubes will be one-quarter the length of pellets or cubes cut if a single cutter was provided. It is obvious that the cutter plate 8 may be provided with any number of blades operating in sequence. Also one cutter 7 is disposed outside the area of extrusion A—B.

It is also obvious that instead of using a movable die-plate 1, this may be fixed and the rollers 4 may rotate about their axes and also about the axis of the die plate, in which case also the cutters 5, 7, will rotate about the axis of the die plate.

In the arrangement of Figure 3, one or more rollers 13 cooperate with the die plate which is in the form of a hollow cylinder 10 having radial perforations 11 through which material is extruded. The material is fed to a lunar space 12 between the internal periphery of the die ring 10, and a roller 13. Either one, both, or all of the elements 10, 13 may be positively driven. Pellets are severed on the outer surface of the die ring 10 by means of a multiple-bladed cutter plate 14 having individual cutters 15, four of which are shown in the arrangement illustrated within the area of extrusion, but it is obvious that any number may be provided. If the plate 10 is stationary the cutter plate 14 is rotated, whereas if the plate 10 is driven the cutter plate is stationary. The pellets 16 so produced will therefore, be in this case one-fifth the length which they would be if a single cutter alone was provided. In the construction of Figures 1, 2, 3 and 4, the meal is compressed between smooth-surfaced rollers; that is to say, truly cylindrical on their outer periphery and not provided with intermeshing ribs, and grooves as in Figures 5 and 6. In the case of the construction of Figure 4, both of the hollow cylindrical die rings can be driven, the cutter plates 23, being stationary with cutters 25 in the area of extrusion and cutters 26 outside this area.

Any more than one cutter blade outside the area of extension would obviously serve no purpose. This extra blade may be disposed anywhere convenient around the periphery of the die ring, as shown at 27 in Figure 6 or as shown at 28 Figure 5, in which latter case a single chute can conveniently be disposed to deliver away the pellets or cubes cut from the knife 28 and from the knives 29 lying within the effective extrusion area A—B. The knife 28 (Figure 5) will cut off any material which, due to pressure in the perforations in the die ring, still exudes therefrom after the knife 28 is placed about three hundred (300) degrees around the ring, but as indicated above, this knife may be placed at any point within that arc.

It will be desirable particularly in the case of the knives such as 29 (Figures 5 and 6) operating within the area A—B through which meal is being extruded at any one moment, that these are adjustable in spacing relatively to one another, as the area A—B will differ in extent according to the type of meal operated upon. For this purpose each blade 29 may be mounted on a separate spindle 30 capable of being clamped in a guide slot 31 in any desired position of adjustment, thus allowing an adjustment of these knives in relative spacing and position to secure the delivery of pellets of completely uniform length. This adjustability of the knives may, of course, be effected in the same or a similar manner in the constructions according to Figures 1 to 4.

I declare that what I claim is:

An extrusion molding machine for forming pellets from plastic material consisting of a perforated die ring and a roller adapted to be relatively displaced in rolling contact, and a plurality of knives contacting with the surface of said die ring opposite the roller, one knife being arranged in the area in which pellets are being extruded at any one moment and another knife being arranged outside of this area.

ALBERT WILLIAM SIZER.